(12) United States Patent
Furukawa et al.

(10) Patent No.: US 6,411,576 B1
(45) Date of Patent: Jun. 25, 2002

(54) ABERRATION COMPENSATION DEVICE, AND AN OPTICAL PICKUP AND AN INFORMATION REPRODUCING/RECORDING APPARATUS EMPLOYING THE SAME

(75) Inventors: Junichi Furukawa; Kiyoshi Tateishi, both of Tsurugashima (JP)

(73) Assignee: Pioneer Corporation, Tokyo-to (JP)

( * ) Notice: Subject to any disclaimer, the term of this patent is extended or adjusted under 35 U.S.C. 154(b) by 0 days.

(21) Appl. No.: 09/429,559

(22) Filed: Oct. 28, 1999

(30) Foreign Application Priority Data

Oct. 29, 1998 (JP) .......................................... 10-309194

(51) Int. Cl.[7] ................................................ G11B 3/90
(52) U.S. Cl. ................................ 369/53.19; 369/53.12; 369/112.02
(58) Field of Search ......................... 369/44.32, 47.49, 369/47.5, 53.12, 53.13, 53.14, 53.19, 53.25, 53.26, 53.27, 53.31, 53.42, 112.02, 112.01, 116

(56) References Cited

U.S. PATENT DOCUMENTS 5,886,496 A * 3/1999 Furukawa et al. ....... 369/44.32
5,914,923 A * 6/1999 Araki et al. ............. 369/44.32

FOREIGN PATENT DOCUMENTS

JP      11-110802      4/1999

* cited by examiner

*Primary Examiner*—Paul W. Huber
(74) *Attorney, Agent, or Firm*—Morgan, Lewis & Bockius LLP

(57) ABSTRACT

An aberration compensation device includes: a phase difference generator for receiving an input signal and for generating a phase difference used for compensating for an aberration induced in a light beam; a temperature detector for detecting a temperature of the phase difference generator; and a corrector for controlling the input signal to be inputted to the phase difference generator based on the temperature detected by the temperature detector thereby to correct a variation of a characteristic of the phase difference generator resulting from a temperature variation.

11 Claims, 12 Drawing Sheets

ABERRATION COMPENSATION DEVICE, AND AN OPTICAL PICKUP AND AN INFORMATION REPRODUCING/RECORDING APPARATUS EMPLOYING THE SAME

BACKGROUND OF THE INVENTION

1. Field of the Invention

The present invention relates to an aberration compensation device which compensates for the aberration induced in a light beam irradiated on a storage medium and reflected therefrom, and an optical pickup and information reproducing and/or recording apparatus employing the aberration compensation device. More specifically, the present invention relates to an aberration compensation device which introduces a phase difference to the light beam before the light beam is irradiated on the storage medium.

2. Description of the Prior Art

There is known a method of compensating for aberration induced in a light beam used for reproducing information as described above. In such a method, a liquid crystal panel having electrodes arranged on both faces of the liquid crystal layers is used to compensate for wavefront aberration resulting from, for example, a tilt of the optical axis of the light beam with respect to the information recording surface of the storage medium. This compensation method using the liquid crystal panel utilizes such a phenomenon that the orientation of liquid crystal molecules of in liquid crystal change dependently upon the applied voltage, and compensates for wavefront aberration resulting from the tilt by changing reflective index of the liquid crystal with respect to the light beam passing therethrough. Namely, by changing the voltage applied to each liquid crystal portion to vary the reflective indexes, the optical path lengths of the light beams are differentiated between different liquid crystal portions (i.e., different phase differences are introduced to the respective sectional portions of the light beams). By this, the optical path length to the information recording surface is varied to cancel out wavefront aberration resulting from the tilt between the information recording surface and the optical axis.

On the other hand, there are known various methods of actually differentiating the optical path difference between different liquid crystal portions. In one example, a transparent electrode for applying the drive voltage to the liquid crystal (normally, arranged on one of or both sides of the liquid crystal) is configured as a combination of a plurality of partial transparent electrodes, and the drive voltages applied to the respective partial transparent electrodes are varied to differentiate the phase difference introduced to the light beams by those partial transparent electrodes.

As is conventionally known, when applying the drive voltage to the liquid crystal to change its orientation and thereby to introduce the phase difference to the light beam passing through the liquid crystal, the drive voltage-phase difference characteristic, which shows the relation between the drive voltage and the phase difference introduced by the drive voltage, varies dependently upon ambient temperature. Namely, as shown in the example of FIG. 1, the range of the linear area of the drive voltage-phase difference characteristic varies dependently upon the temperature, and the slope of the characteristic in the linear area also varies dependently upon ambient temperature, Under such circumstance that the linear area of the drive voltage-phase difference characteristic varies dependently upon the temperature, if a certain drive voltage corresponding to an area having non-linear linear drive voltage-phase difference characteristic is applied at a certain temperature, the phase difference which is obtained at the temperature in the linear area of the drive voltage-phase difference characteristic can not be obtained, and hence an appropriate phase difference can not be introduced to the light beam. Thus, a residual error in the aberration compensation increases, and a tilt margin reduces. In order to avoid the reduction of the tilt margin, in the case of applying drive voltage corresponding to the non-linear area of the drive voltage-phase difference characteristic, separate non-linear circuits for compensating for the non-linearity is provided and controlled in different control methods from temperature to temperature, thereby driving the liquid crystal panel while compensating for such non-linearity. However, providing such separate non-linear circuit to compensate for the drive voltage-phase difference characteristic requires separate non-linearity control for each temperature, which makes the configuration complicated and increases the manufacturing cost.

On the other hand, when the slope of the characteristic within the linear area varies dependently upon ambient temperature, if a constant drive voltage, independent of the temperature, is applied at all temperature to drive the liquid crystal panel in order to simplify the compensation operation, the phase difference actually introduced to the light beam varies dependently upon the temperature variation. This makes the compensation of wavefront aberration unsatisfactory or incomplete, and a so-called compensation error may take place.

SUMMARY OF THE INVENTION

It is an object of the present invention to provide an aberration compensation device which has simple configuration and effectively compensates for the aberration when the drive voltage-phase difference characteristic for applying the phase difference to compensate for the aberration has temperature dependency.

It is another object of the present invention to provide an optical pickup, an information reproducing apparatus and an information recording apparatus which employ the above aberration compensation device and which can reproduce and record information accurately with the aid of the compensation device.

According to one aspect of the present invention, there is provided an aberration compensation device including: a phase difference generator for receiving an input signal and for generating a phase difference used for compensating for an aberration induced in a light beam; a temperature detector for detecting a temperature of the phase difference generator; and a corrector for controlling the input signal to be inputted to the phase difference generator based on the temperature detected by the temperature detector thereby to correct a variation of a characteristic of the phase difference generator resulting from a temperature variation.

Therefore, by controlling the input signal correspondingly to the detected temperature, an appropriate phase difference is generated with the variation of the characteristic of the phase difference generator due to the temperature variation being corrected. Therefore, even ambient temperature varies, the phase difference independent from the temperature variation is introduced to the light beam, and hence the aberration may be effectively compensated for.

The input signal may include a drive signal used to generate the phase difference and a reference signal preset for plural temperature values and functioning as a reference for the drive signal, and the corrector may correct the variation of the characteristic by controlling at least one of the reference signal and the drive signal based on the temperature detected by the temperature detector. By this, the variation of the characteristic can be corrected easily and effectively.

The corrector may correct the variation of the characteristic by regarding the input signal when the phase difference generator is at a temperature higher than a preset reference temperature as the input signal lower than the input signal when the phase difference generator is at room temperature. Thus, the temperature dependency of the phase difference can be corrected.

The corrector may correct the variation of the characteristic by controlling the drive signal based on the temperature detected by the temperature detector and a preset drive signal-phase difference characteristic indicating a relation between the drive signal and the phase difference generated by the drive signal. Therefore, the variation of the characteristic can be effectively corrected on the basis of the specific drive signal-phase difference characteristic of the phase difference generator.

The corrector may correct the variation of the characteristic by controlling the input signal based on the temperature detected by the temperature detector and a preset input signal-phase difference characteristic indicating a relation between the input signal and the phase difference generated by the drive signal. Therefore, the variation of the characteristic can be effectively corrected on the basis of the specific input signal-phase difference characteristic of the phase difference generator.

The corrector may generate the reference signal such that the drive signal is applied to the phase difference generator within a range where the input signal-phase difference characteristic is linear. By this, the phase difference generator can be driven linearly to generate appropriate phase difference.

The corrector may include a memory unit for storing a plurality of reference signals preset in correspondence with the temperature values, and the corrector may read out the reference signal corresponding to the temperature detected by the temperature detector from the memory unit to generate the input signal and correct the variation of the characteristic. Thus, the variation of the characteristic can be corrected with controlling the reference signal by using a simple configuration.

In a preferred embodiment, the aberration is induced in the light beam due to a tilt generated between an optical axis of a light beam and a storage medium when the light beam is irradiated on the storage medium. Thus, the aberration induced between the optical axis of the light beam and the storage medium can be reliably compensated for.

According to another aspect of the present invention, there is provided an optical pickup including: the aberration compensation device described above; a light emitter for emitting a light beam to be incident upon the aberration compensation device; a tilt detector for detecting the tilt; and a light receiver for receiving the light beam after the aberration is compensated for and for generating a light reception signal. The corrector may generate the input signal and input the input signal to the phase difference generator, the input signal including the drive signal used to introduce the phase difference to the light beam to compensate for the aberration due to the tilt detected by the tilt detector. Therefore, information can be accurately recorded and reproduced by a simple configuration, with wavefront aberration being compensated for.

According to still another aspect of the present invention, there is provided an information reproduction apparatus including: the optical pickup described above; and a reproduction unit for reproducing information from the storage medium based on the light reception signal. Therefore, information can be accurately reproduced with the aberration due to the tilt between the light beam axis and the storage medium being effectively compensated for.

According to still another aspect of the present invention, there is provided an information recording apparatus including: the optical pickup described above; a reproduction unit for reproducing information from the storage medium based on the light reception signal; and a recording unit for controlling the light beam based on the information reproduced by the reproduction unit and recording information thereby to record the recording information. Therefore, information can be accurately recorded with the aberration due to the tilt between the light beam axis and the storage medium being effectively compensated for.

The nature, utility, and further features of this invention will be more clearly apparent from the following detailed description with respect to preferred embodiment of the invention when read in conjunction with the accompanying drawings briefly described below.

BRIEF DESCRIPTION OF THE DRAWINGS

FIGS. 4A and 4B are schematic diagrams showing a configuration of a liquid crystal panel, wherein FIG. 4A shows a vertical section of the liquid crystal panel and FIG. 4B shows the arrangement of transparent electrodes on the panel.

FIGS. 5A to 5C are graphs showing setting of the reference voltage, wherein FIG. 5A shows the variation of the driving range according to the temperature, FIG. 5B shows the drive voltage-phase difference characteristic at high temperature and FIG. 5C shows the drive voltage-phase difference characteristic at room temperature.

FIG. 9B shows the correction of the phase sensitivity at low temperature, and FIG. 9C shows the relation between the tilt angle and the liquid crystal panel drive voltage before and after the phase difference sensitivity correction.

DETAILED DESCRIPTION OF THE PREFERRED EMBODIMENTS

The preferred embodiments of the present invention will now be described below with reference to the attached drawings.

[I] 1st Embodiment

The first embodiment of the present invention will be described with reference to FIGS. 2, 3, 4A, 4B, 5A to 5C and 6. It is noted that the first embodiment is directed to a case where the present invention is applied to an information reproducing apparatus which reads out recorded information from an optical disc, serving as a storage medium, while compensating for wavefront aberration induced by a variation in a radial direction (i.e., radial direction of the optical disc) of an angle produced by the optical disc and an optical axis of a light beam (i.e., a tilt resulting from a warping of the optical disc itself, an external vibration, a disc vibration due to disc rotation or other possible causes).

Figure 1:
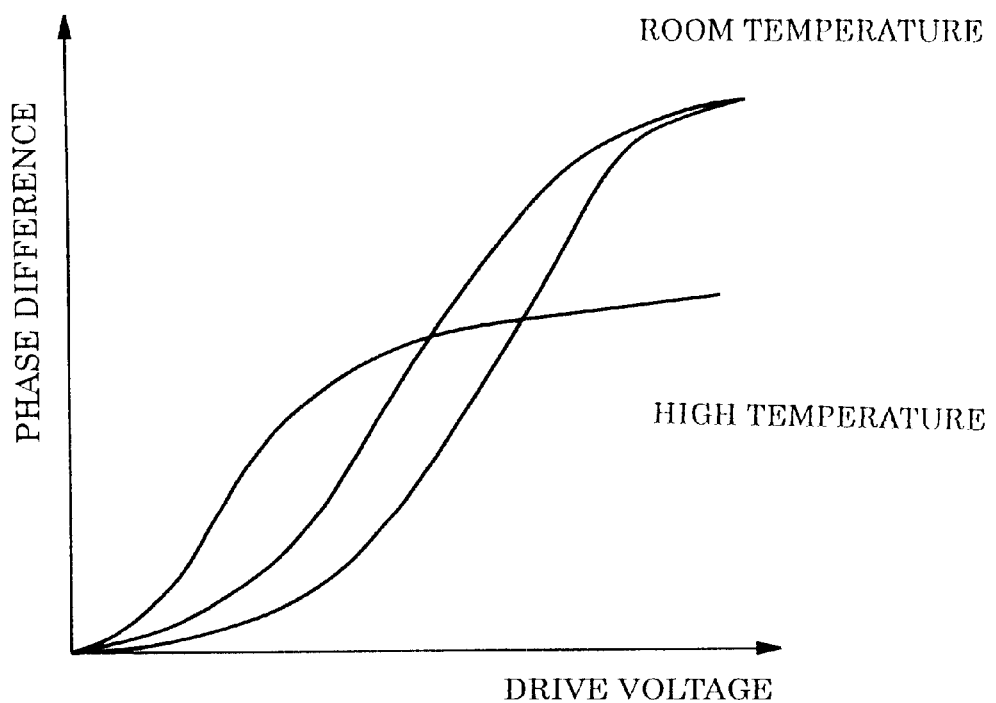
FIG. 1 is a graph showing a temperature-dependent variation of a drive voltage-phase difference characteristic.
Figure 2:
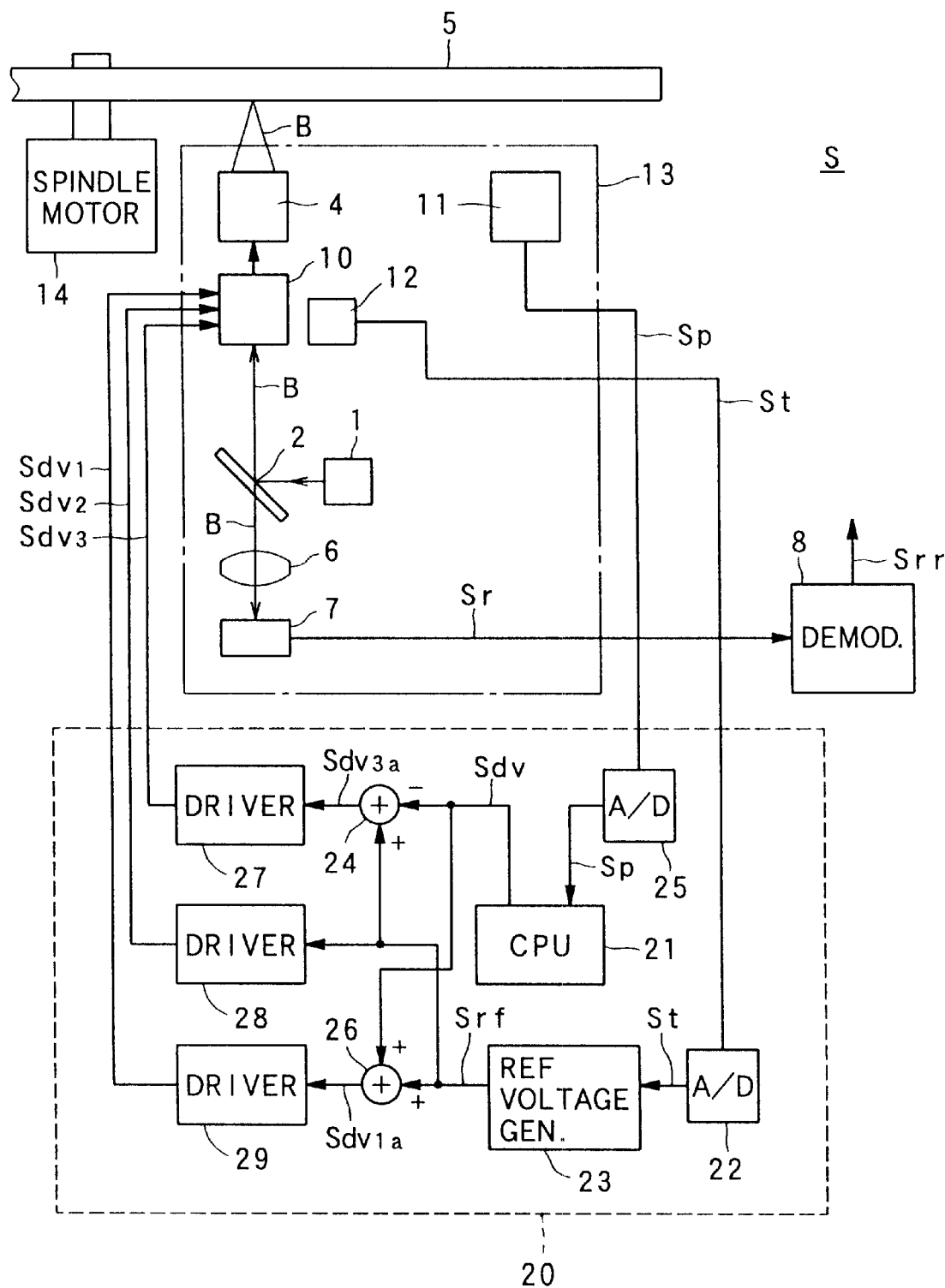
FIG. 2 is a block diagram showing a configuration of an information reproducing apparatus according to the first embodiment of the present invention.
Figure 3:
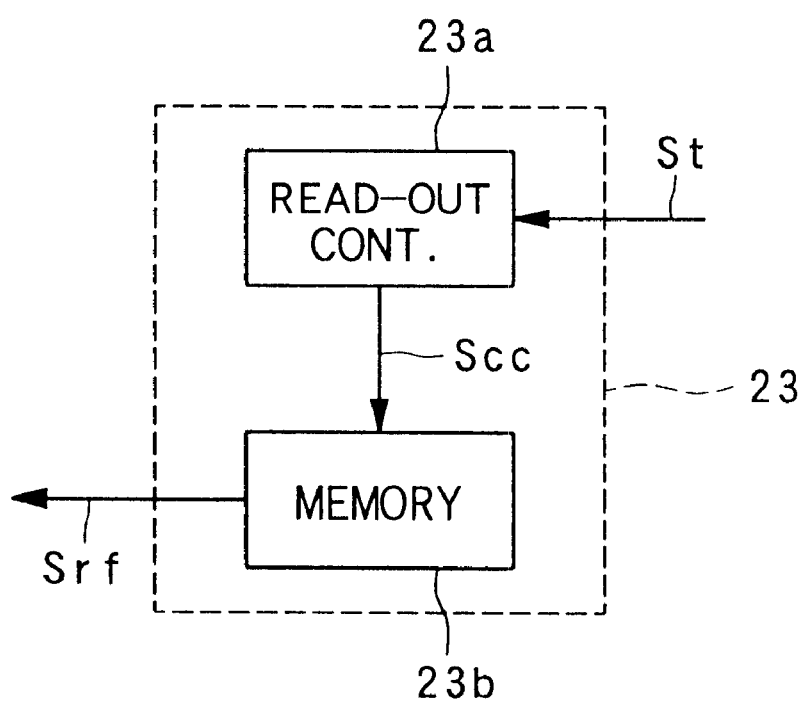
FIG. 3 is a block diagram showing a reference voltage generating unit of the first embodiment.
Figure 4A:
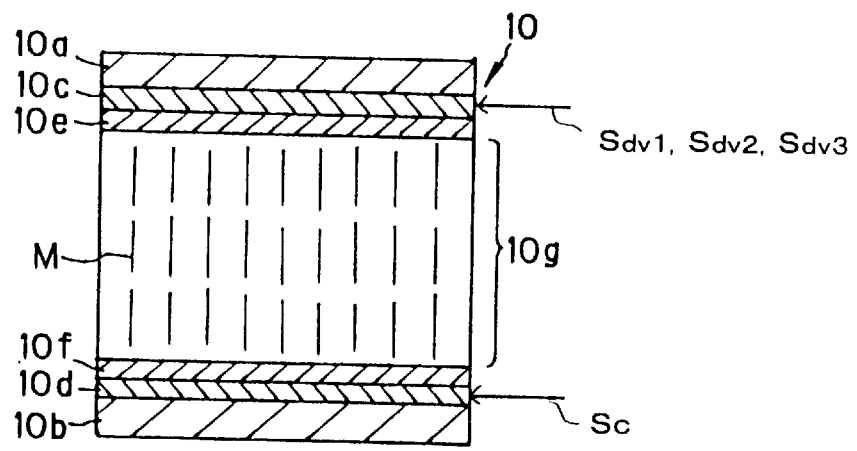
Figure 4B:
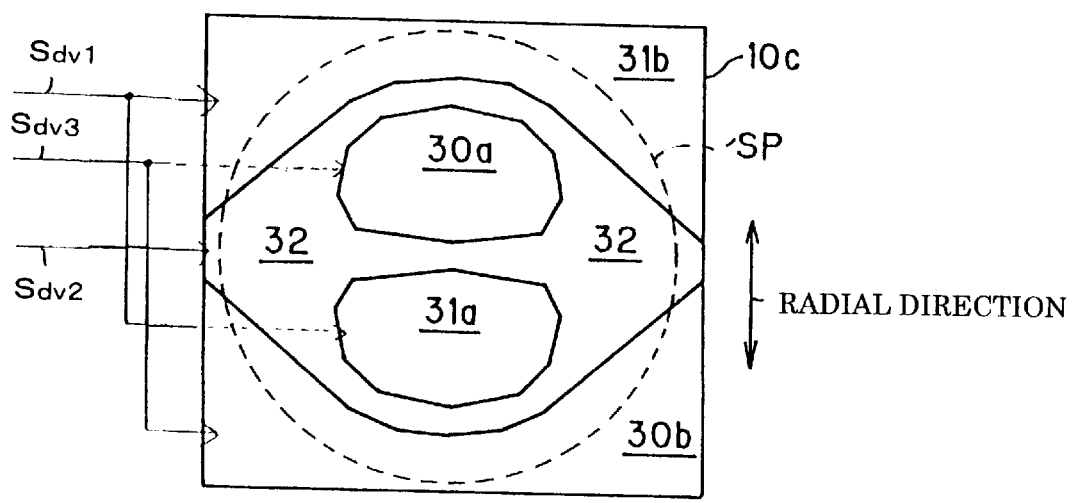
Figure 5A:
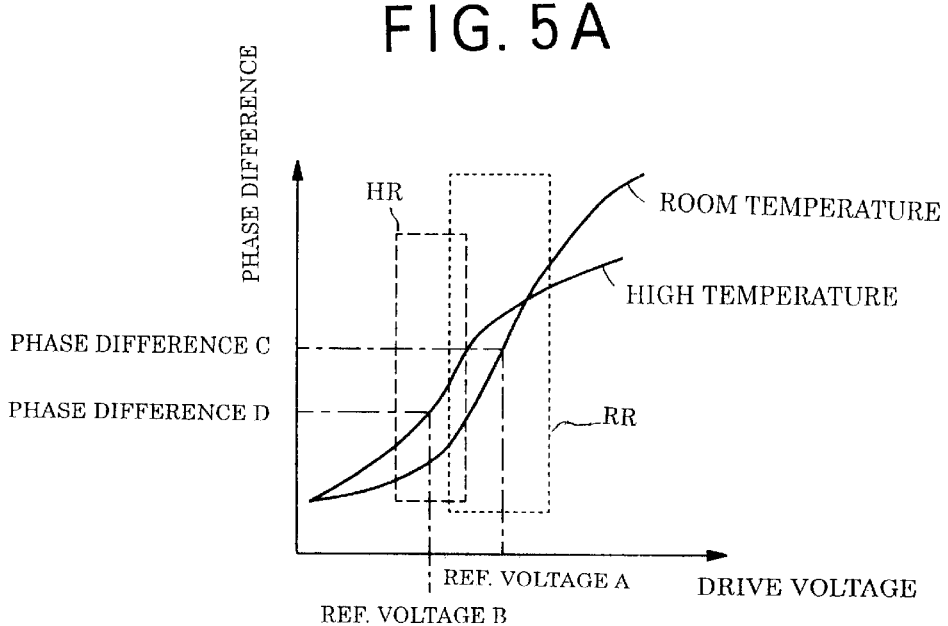
Figure 5B:
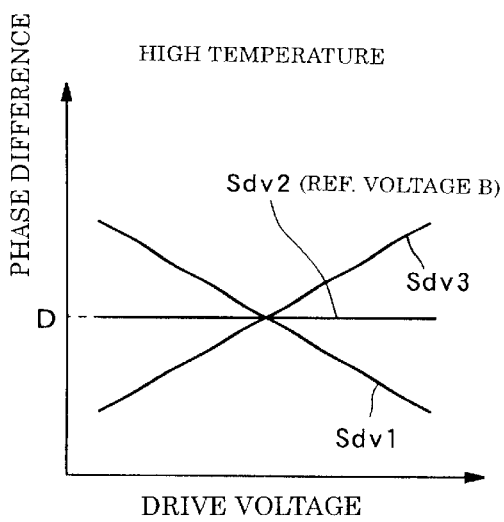
Figure 5C:
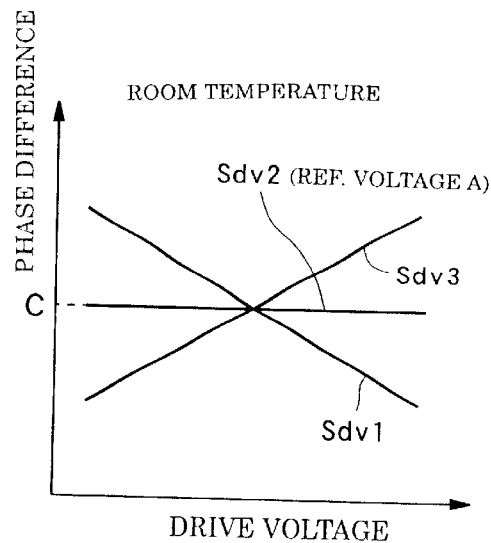
Figure 6:
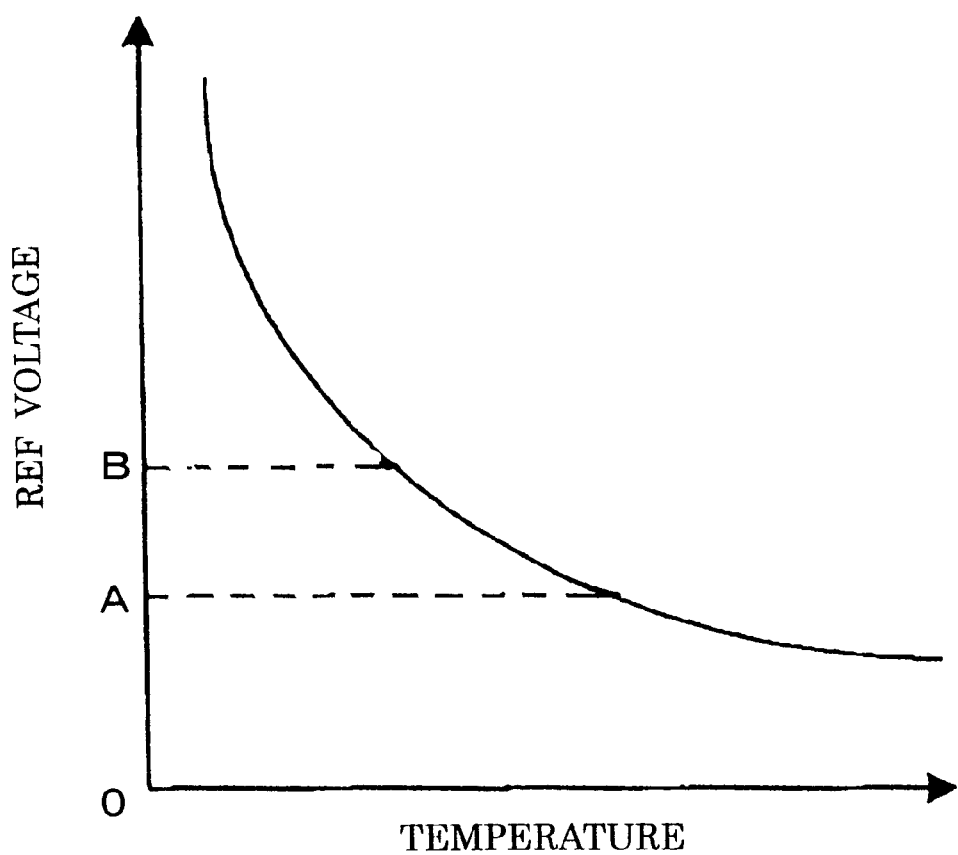
FIG. 6 is a graph showing a temperature variation of the reference voltage.

FIG. 2 is a block diagram showing an overall configuration of an information reproducing apparatus according to the first embodiment of the present invention, FIG. 3 is a block diagram showing a detailed configuration of a reference voltage generating unit, FIGS. 4A and 4B are schematic diagrams showing a configuration of a liquid crystal panel, FIGS. 5A to 5C are graphs used for explaining the setting of the reference voltage, and FIG. 6 is a graph showing a temperature characteristic of the reference voltage.

First, the overall configuration of the information reproducing apparatus of the first embodiment will be described with reference to FIG. 2. As shown in FIG. 2, the information reproducing apparatus S of the first embodiment includes a spindle motor 14, an optical pickup 13, a tilt control unit 20, and a demodulation unit 8. The spindle motor rotates an optical disc 5 at a given rotation speed. The optical pickup 13 irradiates a light beam B onto the optical disc while compensating for wavefront aberration occurring due to the above mentioned tilt, and outputs a reproduction signal Sr corresponding to information recorded on the optical disc 5 based on the light beam B reflected by the optical disc 5. The tilt control unit 20 compensates for wavefront aberration by driving a liquid crystal panel 10 included in the optical pickup 13 and described later. The demodulation unit 8 applies given demodulation processing onto the reproduction signal Sr and outputs the resultant signal to an external display and/or speakers (not shown) as a demodulation signal Srr.

The optical pickup 13 includes a laser diode 1, a half mirror 2, an objective lens 4, a condenser lens 6, a light receiver 7, a liquid crystal panel 10, a radial tilt sensor 11 for detecting a tilt angle in the radial direction within an area on the optical disc 5 on which the light beam B is irradiated, and a temperature sensor 12 for detecting the temperature of the liquid crystal panel 10. The tilt control unit 20 includes a CPU 21, A/D converters 22 and 25, a reference voltage generation unit 23, adders 24 and 26, and drivers 27, 28 and 29. Each of the drivers 27 to 29 includes a PWM (Pulse Width Modulation) circuit and an amplifier. As shown in FIG. 3, the reference voltage generation unit 23 includes a read-out control unit 23a and a memory 23b.

Next, the overall operation will be described. The optical disc 5 is rotated by the spindle motor 14 at the given rotation speed. During the rotation, the light beam B emitted by the laser diode 1 is reflected by the half-mirror 2 and enters the liquid crystal panel 10. During the passage through the liquid crystal panel 10, a phase difference used to compensate for wavefront aberration due to the tilt is introduced to the light beam B by the processing described later. Then, the light beam B is condensed on the information recording surface of the optical disc 5 by the objective lens 4. Then, the light beam B reflected by the information recording surface of the optical disc 5 passes through the objective lens 4 and the liquid crystal panel 10 once again, also passes through the half-mirror 2, and condensed on the light receiver 7 via the condenser lens 6. The reflected version of the light beam B, received by the light receiver 7, is converted into an electric reproduction signal Sr by the light receiver 7, and then is supplied to the demodulator 8. Then, as described above, the demodulator 8 conducts given demodulation processing on the reproduction signal Sr, and the resultant signal is supplied to the display and/or the speakers (not shown) as the demodulation signal Srr corresponding to information recorded on the optical disc 5. Simultaneously with the above operation, the radial direction tilt angle of the optical disc 5 is detected by the radial tilt sensor 11, and is outputted as a tilt detection signal Sp which is an analog signal. Then, the tilt detection signal Sp is digitized by the A/D converter 25 and supplied to the CPU 21. The radial tilt sensor 11 is an optical sensor which has a light emitting unit and two light receivers arranged in a spaced manner in the radial direction. In the radial tilt sensor 11, the light emitted by the light emitting unit and reflected by the optical disc 5 is received by the respective light receivers to detect the radial direction tilt angle of the optical disc 5 based on the difference of the received light quantities.

The CPU 21 calculates the aberration compensation amount in the radial direction, for each pattern electrodes in the liquid crystal panel 10 described later, based on the tilt detection signal Sp outputted by the A/D converter 25. The aberration compensation amount is a phase difference amount to be introduced to the light beam B, passing through the liquid crystal panel 10, to cancel out wavefront aberration induced by the radial direction tilt. Then, the CPU 21 generates a drive signal Sdv used to introduce the calculated phase difference to the light beam B, and supplies it to the adders 24 and 26. At that time, the CPU 21 calculates the aberration compensation amount corresponding to the value of the tilt detection signal Sp by utilizing the compensation amount data indicating the aberration compensation amounts for various tilt angles and are store in a ROM (not shown) in advance. It is noted that the drive signal Sdv outputted by the CPU 21 remains unchanged even if the temperature of the liquid crystal panel 10 varies.

During these operation, the temperature sensor 12 detects the temperature of the liquid crystal panel 10, and generates a temperature detection signal St which is an analog signal indicating the detected temperature of the liquid crystal panel 10. The temperature detection signal St is digitized by the A/D converter 22, and is inputted to the reference voltage generation unit 23. The reference voltage generation unit 23 generates a reference voltage based on the temperature of the liquid crystal panel 10 represented by the inputted temperature detection signal St, and supplies it to the driver 28, the adder 24 and the adder 26 as a reference signal Srf. The reference voltage is used as a reference value to set the level range of the respective drive signals to be applied to the transparent electrode 10c (described later) when the liquid crystal panel 10 is driven.

The operation of the reference voltage generation unit 23 will be described more specifically. The memory 23b stores a plurality of preset reference voltage values corresponding to a plurality of preset temperature values. The plurality of temperature values are determined by dividing a possible temperature range, in which the liquid crystal panel 10 is driven, by a given temperature width. The setting of the reference voltage will be described later in more detail.

Then, the read-out control unit 23a generates a control signal Scc based on the temperature detection signal St and supplies it to the memory 23b. The memory 23b outputs the reference voltage corresponding to the temperature indicated by the control signal Scc. The adder 24 subtracts the drive signal Sdv from the inputted reference signal Srf, and supplies the resultant signal to the driver 27 as a third drive signal Sdv3a. The driver 27 conducts the PWM modulation and amplification onto the third drive signal Sdv3a, and outputs it to some pattern electrodes (described later) in the liquid crystal panel 10 as the third drive signal Sdv3. The adder 26 adds the drive signal Sdv to the inputted reference signal Srf to produce the first drive signal Sdv1a, and supplies it to the driver 29. The driver 29 conducts the PWM modulation and amplification on the first drive signal Sdv1a, and outputs the resultant signal as the first drive signal Sdv1 to other pattern electrodes in the liquid crystal panel 10, described later. Simultaneously, the driver 28 directly conducts the PWM modulation and amplification on the inputted reference signal Srf, and outputs the resultant signal as the second drive signal Sdv2 to still other pattern electrode in the liquid crystal panel 10.

Now, the relation between the first drive signal Sdv1 to the third drive signal Sdv3, outputted by the respective drivers 27 to 29, will be studied. As a result of the operation by the adders 24 and 26, the third drive signal Sdv3 has a voltage value larger than the second drive signal Sdv2 by the voltage represented by the driver signal Sdv, and the first drive signal Sdv1 has a voltage value larger than the second drive signal Sdv2 by the voltage represented by the drive signal Sdv. In other words, the third drive signal Sdv3 and the first drive signal Sdv1 have the voltage values in symmetrical relation with each other with the voltage value of the second drive signal Sdv2 serving as the center. Based on the first to third drive signals Sdv1, Sdv2 and Sdv2 outputted to the respective pattern electrodes, the liquid crystal panel 10 is driven to control the refractive index. Thereby, the a desired phase difference is introduced to the light beam B passing through the liquid crystal panel 10, and wavefront aberration in the radial direction is compensated for.

Next, the structure and the operation of the liquid crystal panel 10 will be described with reference to FIGS. 4A and 4B. As shown in the sectional view of FIG. 4A, the liquid crystal panel 10 includes liquid crystal 10g containing liquid molecules M, orientation membranes 10e and 10f for providing the liquid crystal 10g with a predetermined molecule orientation, and transparent electrodes 10c and 10d which are composed of ITO (Indium-tin Oxide), etc. and formed outside of the orientation membranes 10e and 10f, respectively. Further, glass substrates 10a and 10b, serving as protection layers, are formed outermost sides of the liquid crystal panel 10. With this structure, the transparent electrode 10c has a function to compensate for wavefront aberration resulting from the optical axis tilt in the radial direction, and is partitioned into plural pattern electrodes corresponding to the distribution of wavefront aberration. Unlike the transparent electrode 10c, the transparent electrode 10d is not partitioned. The transparent electrode 10d is a single continuous transparent electrode which may be grounded or supplied with an electrode signal Sc having a predetermined constant voltage as shown in FIG. 4A. The liquid crystal 10g has a so-called double refraction effect, in which the refractive indexes of the liquid crystal 10g in the direction of the optical axis of the liquid molecule M and the direction perpendicular thereto are different from each other. By varying the voltage value applied to the transparent electrode 10c, the orientation of the liquid molecules M in the liquid crystal 10g can be arbitrarily changed from a horizontal direction to the vertical direction as shown in FIG. 4A.

Next, the structure of the transparent electrode 10c will be described with reference to FIG. 4B. As shown in FIG. 4B, the transparent electrode 10c is partitioned into five pattern electrodes 30a, 30b, 31a, 31b and 32, all of which are electrically insulated from one another. The reason why the transparent electrode 10c is partitioned into the respective pattern electrodes 30a, 30b, 31a, 31b and 32 as shown in FIG. 4B is to make the shape of the pattern electrodes (i.e., the partitioning fashion of areas independently controlled and driven) to have a substantially identical shape to the distribution of radial direction wavefront aberration induced on the pupil surface of the lens 4 due to tilt. The overall size of the transparent electrode 10c is determined such that the light beam B is incident upon the transparent electrode 10c with the range SP shown by the broken line in FIG. 4B. Out of those pattern electrodes, the third drive signal Sdv3 is applied to the pattern electrodes 30a and 30b, the first drive signal Sdv1 is applied to the pattern electrode 31a and 31b, and the second drive signal Sdv2 is applied to the pattern electrode 32.

Since the drive signals Sdv1 to Sdv3 have the above mentioned symmetrical relation, the areas of liquid crystal 10g corresponding to the pattern electrode 31b and the pattern electrode 30b introduce the phase differences of opposite polarity to the light beam B passing therethrough with respect to the light beam B passing through the area of the liquid crystal 10g corresponding to the pattern electrode 32. Further, the areas of liquid crystal 10g corresponding to the pattern electrode 30a and the pattern electrode 31a introduce the phase differences of opposite polarity to the light beam B passing therethrough with respect to the light beam B passing through the area of the liquid crystal 10g corresponding to the pattern electrode 32. Thus, the respective pattern electrodes introduce the above mentioned different phase differences to the portions of the light beam B to effectively compensate for wavefront aberration resulting from tilt. It is noted that Japanese patent application H09-271801 discloses, in the paragraphs [0061] to [0085], in detail, the reason why wavefront aberration can be compensated for by controlling the drive signals applied to the pattern electrodes as well as how to determine the shapes of the pattern electrodes. The whole disclosure of the Japanese patent application H09-271801 is incorporated herein by reference.

Next, the setting of the reference voltage in the reference voltage generation unit 23 of the present invention will be described with reference to FIGS. 5A to 5C. FIG. 5A shows the relation (hereinafter simply referred to as "drive voltage-phase difference characteristic") of the phase difference actually introduced to the light beam B by the first to third drive signals Sdv1 to Sdv3 with respect to the voltages of the first to third drive signals Sdv1 to Sdv3 applied to the pattern electrodes, when the phase difference is introduced to the light beam B by driving the liquid crystal panel 10 in the above described manner. As seen, the linear range of the drive voltage-phase difference characteristic shown in FIG. 5A varies dependently upon the temperature. Therefore, in the first embodiment, the reference voltage represented by the reference signal Srf is varied in accordance with the temperature such that the first to third drive signals Sdv1 to Sdv3 are applied to the respective pattern electrodes within the linear range of the drive voltage-phase difference characteristic for each temperature, thereby linearly driving the liquid crystal 10g of the areas corresponding to the respective patterns electrodes.

More specifically, at high temperature, the reference voltage represented by the reference signal Srf is set to be the reference voltage B so that the liquid crystal 10g is driven within the linear range shown by the broken line HR. The reference voltage B is stored in the memory 23b as the reference voltage for the high temperature state. When the temperature sensor 12 detects that the temperature of the liquid crystal panel 10 belongs to the high temperature range, the reference voltage B is outputted as the reference signal Srf. By this, the voltage range of the first to third drive signals Sdv1 to Sdv3 applied to the pattern electrodes of the liquid crystal panel 10 is set to the range HR represented by the broken line, and thereby the liquid crystal 10g is driven linearly. In other words, as shown in FIG. 5B, at high temperature, the second drive signal Sdv2 (i.e., the reference voltage B) is applied to the pattern electrode 32 so that a constant phase difference D is always introduced to the light beam B in the corresponding area of the liquid crystal panel 10. The third drive signal Sdv3 is applied to the pattern electrodes 30a and 30b so that the phase difference varying in accordance with the increase of tilt (i.e., the increase of wavefront aberration) is introduced to the light beam B in the corresponding area of the liquid crystal panel 10. Further, the first drive signal Sdv1 is applied to the pattern electrodes 31a and 31b so that the phase difference decreasing according to the increase of the tilt is introduced to the light beam B in the corresponding area of the liquid crystal panel 10. Thus, wavefront aberration being induced is effectively compensated for by the introduction of those phase differences.

On the other hand, at room temperature, the reference voltage represented by the reference signal Srf is set to be the reference voltage A so that the liquid crystal 10g is driven within the linear range RR shown by the broken line. The reference voltage A is stored in the memory 23b as the reference voltage for the room temperature state. When the temperature sensor 12 detects that the temperature of the liquid crystal panel 10 belongs to the room temperature range, the reference voltage A is outputted as the reference signal Srf. By this, the voltage range of the first to third drive signals Sdv1 to Sdv3 applied to the pattern electrodes of the liquid crystal panel 10 is set to the range RR represented by the broken line, and thereby the liquid crystal 10g is driven linearly. In other words, as shown in FIG. 5C, at room temperature, the second drive signal Sdv2 (i.e., the reference voltage A) is applied to the pattern electrode 32 so that a constant phase difference C is always introduced to the light beam B in the corresponding area of the liquid crystal panel 10. The third drive signal Sdv3 is applied to the pattern electrodes 30a and 30b so that the phase difference varying in accordance with the increase of tilt is introduced to the light beam B in the corresponding area of the liquid crystal panel 10. Further, the first drive signal Sdv1 is applied to the pattern electrodes 31a and 31b so that the phase difference decreasing according to the increase of the tilt is introduced to the light beam B in the corresponding area of the liquid crystal panel 10. Thus, wavefront aberration being induced is effectively compensated for by the introduction of those phase differences.

Now, the temperature characteristic of the reference voltage stored in the memory 23b will be studied. Taking the relation between the reference voltage A and the reference voltage B into account, it is desirable that the reference voltage value is set to decrease like a high-order function manner as the temperature increases, in view of the drive voltage-phase difference characteristic in the liquid crystal panel 10 shown in FIG. 5A.

As described above, according to the driving method of the liquid crystal panel 10 of the first embodiment, the first to third drive signals Sdv1 to Sdv3 within the linear range, in which the drive voltage-phase difference characteristic at the detected temperature is linear, are applied to the liquid crystal panel 10 to compensate for wavefront aberration. Therefore, the liquid crystal panel 10 can be linearly driven to compensate for wavefront aberration due to tilt. Further, based on the reference voltage preset for each temperature, the first to third drive signals Sdv1 to Sdv3 within the linear range are generated. Therefore, the liquid crystal panel 10 can be linearly driven by a simple configuration, thereby to compensate for wavefront aberration due to tilt. Still further, since the first to third drive signals Sdv1 to Sdv3 within the linear range are generated by reading out the reference voltage corresponding to the detected temperature from the memory 23b in which plural reference voltages are stored in advance. Therefore, the liquid crystal panel 10 can be linearly driven to compensate for wavefront aberration due to tilt with further simplified configuration, and thus information can be correctly reproduced.

[II] 2nd Embodiment

Figure 7:
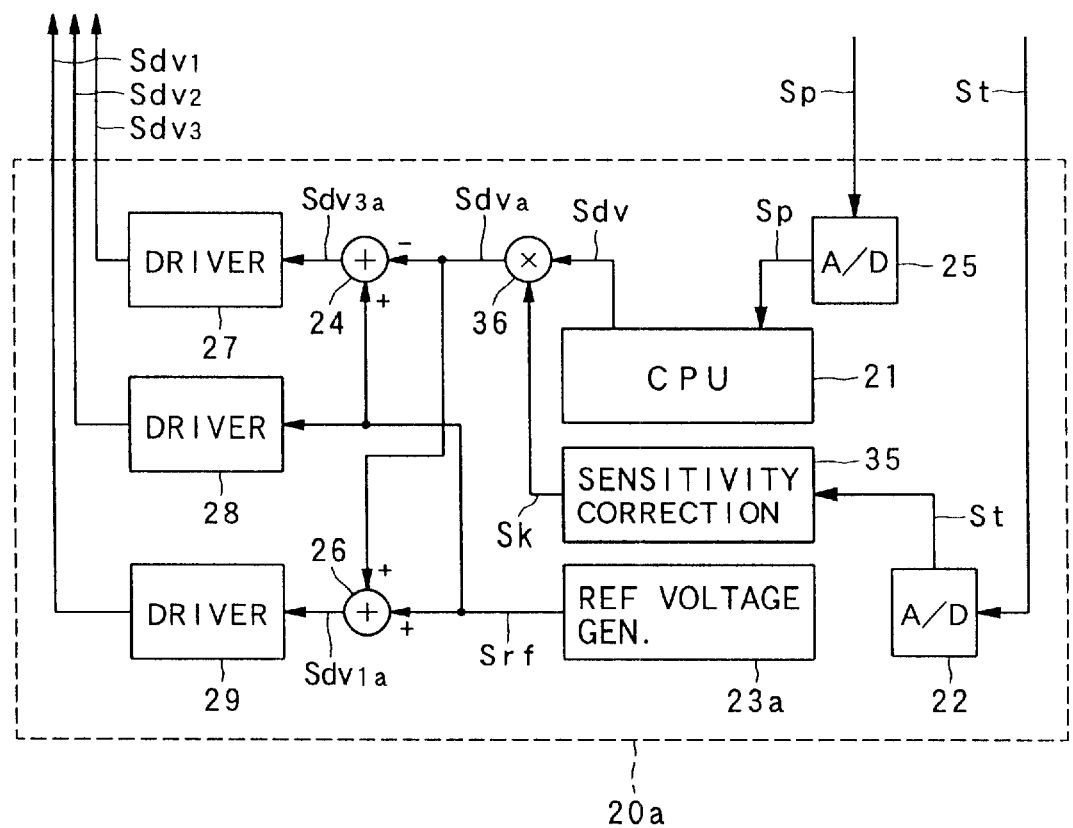
FIG. 7 is a block diagram showing a schematic configuration of a tilt control unit according to the second embodiment of the present invention.
Figure 8:
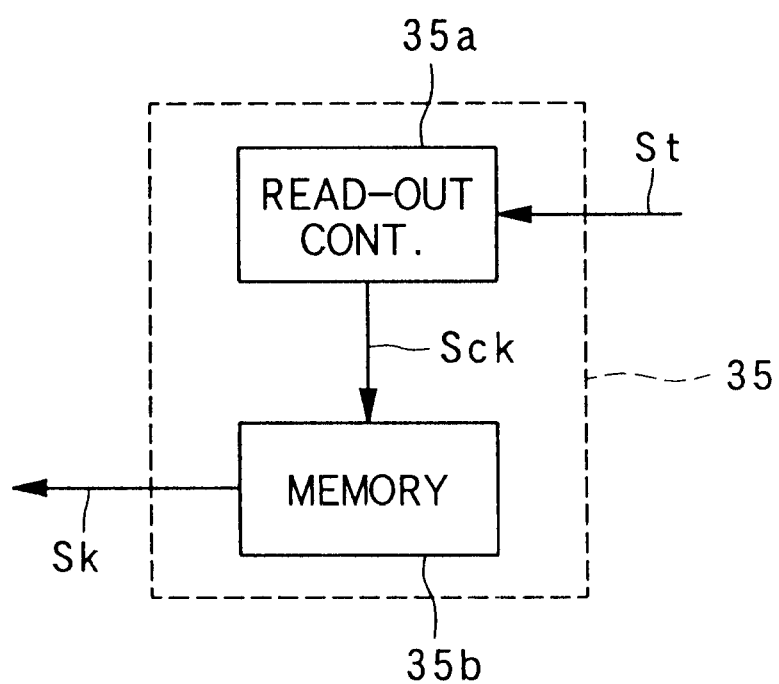
FIG. 8 is a block diagram showing a detailed configuration of a sensitivity correction unit of the second embodiment.
Figure 9A:
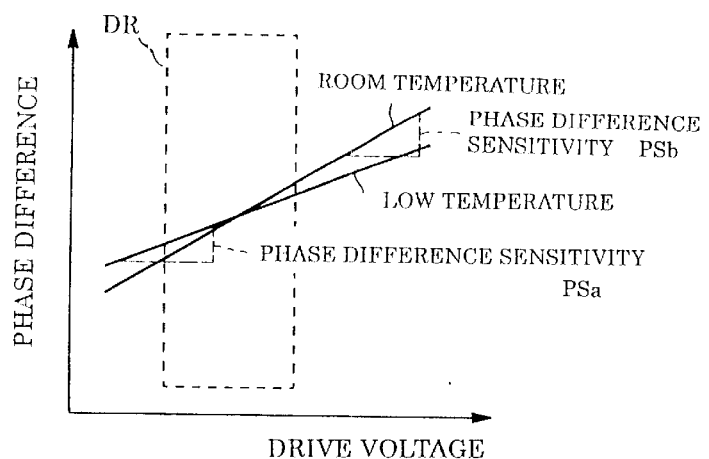
FIGS. 9A to 9C are graphs illustrating the setting of the correction factor, wherein FIG, 9A shows the variation of phase sensitivity according to ambient temperature.
Figure 9B:
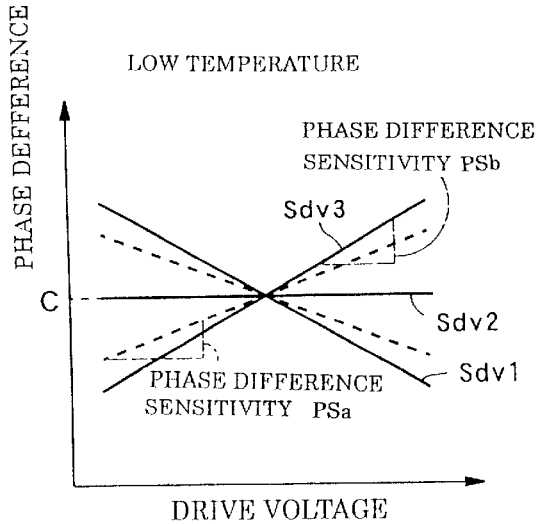
Figure 9C:
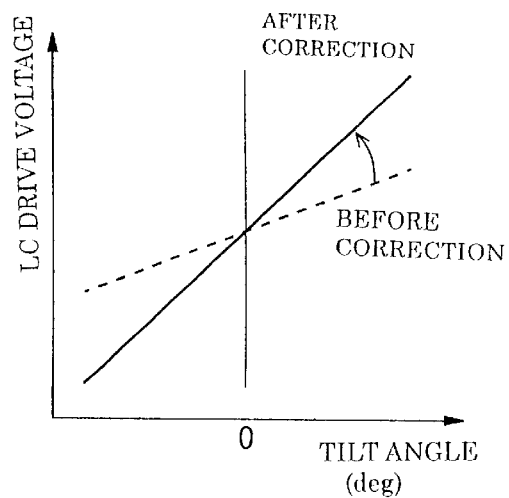
Figure 10:
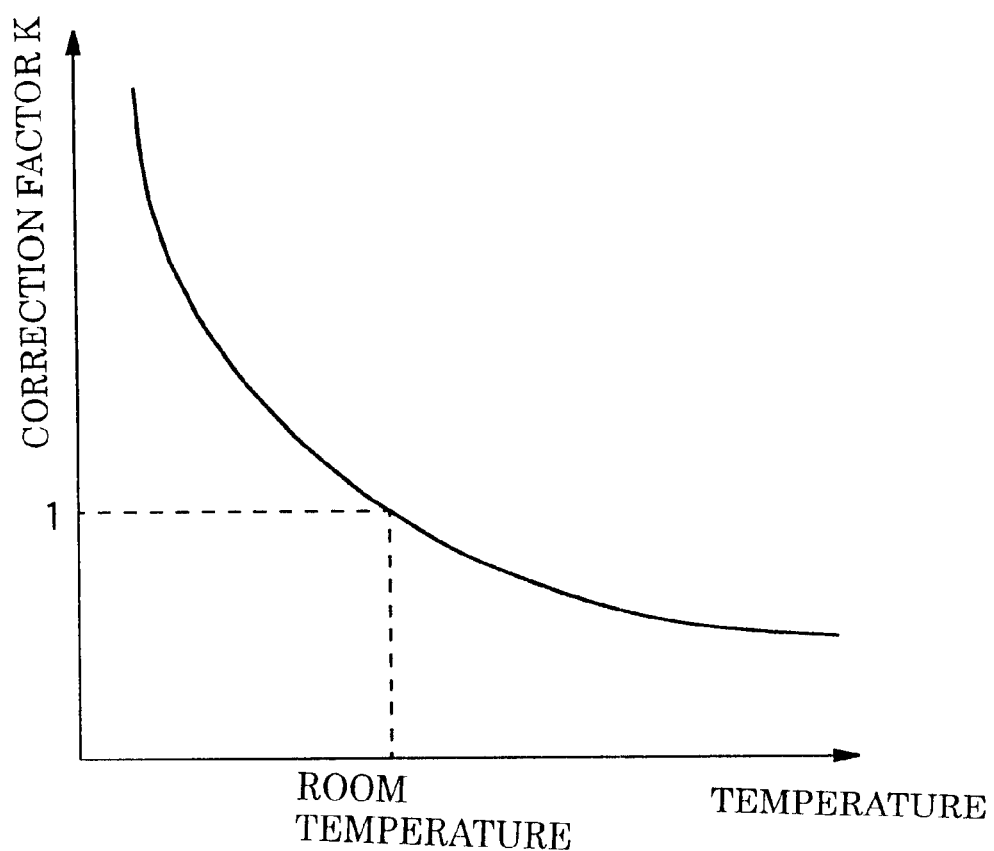
FIG. 10 is a graph showing a temperature characteristic of the correction factor according to the second embodiment.

Next, the second embodiment of the present invention will be described with reference to FIGS. 7 to 10. FIG. 7 is a block diagram showing a schematic configuration of a tilt control unit in an information reproduction apparatus according to the second embodiment of the present invention. FIG. 8 is a block diagram showing a detailed configuration of a sensitivity correction unit, and FIGS. 9A to 9C are graphs for explaining the setting of the correction factor. FIG. 10 is a graph showing a temperature characteristic of the correction factor. In FIG. 7, the components identical to those of the information reproduction apparatus S of the first embodiment are represented by identical reference numerals and the detailed description therefor will be omitted.

In the first embodiment, in consideration that the linear range of the drive voltage-phase difference characteristic of the liquid crystal panel 10 varies dependently upon the temperature, the drive voltage is varied according to the temperature to constantly drive the liquid crystal panel 10 at the linear range of the drive voltage-phase difference characteristic. In contrast, in the second embodiment, in consideration that the slope of the drive voltage-phase difference characteristic also varies dependently upon the temperature, the drive signals are generated such that the liquid crystal panel 10 is driven, at each temperature, according to the drive voltage-phase difference characteristic similar to that at room temperature.

First, the configuration of the tilt control unit according to the second embodiment will be described with reference to FIG. 7. It is noted that, since the configuration and operation of the components in the information reproduction apparatus of the second embodiment are identical to those of the apparatus of the first embodiment, except for the tilt control unit, the detailed description for those identical components will be omitted. As shown in FIG. 7, the tilt control unit 20a of the second embodiment includes the CPU 21, the A/D converters 22 and 25, the adders 24 and 26, and the drivers 27 to 29, which are identical to those in the first embodiment. In addition, the tilt control unit 20a includes a reference voltage generation unit 23a, a sensitivity correction unit 35 and a multiplier 36. Further, as shown in FIG. 8, the sensitivity correction unit 35 includes a read-out control unit 35a and a memory 35b.

Next, the operation of the tilt control unit 20a will be described. First, like the first embodiment, the aberration compensation amount in the radial direction for each pattern electrode is calculated based on the inputted tilt detection signal Sp. Then, the drive signal Sdv for giving the calculated aberration compensation amount to the light beam B (i.e., the drive signal Sdv independent from the temperature variation of the liquid crystal panel 10) is generated and supplied to the multiplier 36. In this situation, the phase difference compensation amount is preset, in advance, based on the drive voltage-phase difference characteristic of the liquid crystal panel at room temperature. Simultaneously, the sensitivity correction unit 35 generates the correction signal Sk based on the temperature of the liquid crystal panel 10 represented by the temperature detection signal St, which has been digitized and inputted, and supplies the correction signal Sk to the multiplier 36. The correction signal Sk includes the correction factor K used to correct the drive signal Sdv such that the phase difference similar to the case of room temperature can be obtained if the liquid crystal panel 10 is driven by the drive signal Sdv (i.e., the drive signal generated by using the drive voltage-phase difference characteristic of room temperature) at the temperature represented by the temperature detection signal St. Specifically, with respect to the operation of the sensitivity correction unit 35, the memory 35b stores a plurality of preset correction factors K corresponding to the plurality of preset temperatures (namely, like the case of the reference voltage generation unit 23 of the first embodiment, a plurality of temperatures obtained by dividing the possible temperature range at the circumstance, in which the liquid crystal panel 10 is driven, by a given temperature widths). The setting of the correction factor will be described later in more detail. Then, the read-out control unit 35a generates the control signal Sck and supplies it to the memory 35b. The control signal Sck is used to control the memory 35b to output the correction factor K corresponding to the temperature represented by the inputted temperature detection signal St. By this, the memory 35b outputs the correction factor K corresponding to the temperature represented by the control signal Sck as the correction signal Sk. Then, the multiplier 36 multiplies the drive signal Sdv by the correction factor K included in the correction signal Sk to generate the corrected drive signal Sdva, and supplies it to the adders 24 and 26.

Simultaneously, the reference voltage generation unit 23a supplies the reference signal Srf, including the constant reference voltage independent from the temperature variation of the liquid crystal panel 10, to the drive 28 and the adders 24 and 26. The constant reference voltage may be the reference voltage outputted by the reference signal generation unit 23 of the first embodiment and corresponding to room temperature. Then, the adder 24 subtracts the corrected drive signal Sdv from the inputted reference signal Srf and supplies the resultant signal to the driver 27 as the third drive signal Sdv3a. The driver 27 generates the third drive signal Sdv3 by the same operation as that in the first embodiment, and supplies it to the pattern electrodes 30a and 30b. The adder 26 adds the corrected drive signal Sdva to the inputted reference signal Srf, and supplies the resultant signal to the driver 29 as the first drive signal Sdv1a. The driver 29 generates the first drive signal Sdv by the same operation as that in the first embodiment, and supplies it to the pattern electrodes 31a and 31b. In addition, the driver 28 applies the same processing as that in the first embodiment to the inputted reference signal Srf, and supplies the resultant signal to the pattern electrode 32 of the liquid crystal panel 10 as the second drive signal Sdv2. Studying the relation of the first to third drive signals Sdv1 to Sdv3 outputted by the respective drivers 27 to 29, like the first embodiment, the third drive signal Sdv3 and the first drive signal Sdv1 have the voltage values which are symmetric with respect to the voltage value of the second drive signal Sdv2 serving as their center. Then, the liquid crystal panel 10 is driven by the first to third drive signals Sdv1 to Sdv3 supplied to the pattern electrodes to control the refractive index of the liquid crystal panel 10. Thus, a desired phase difference is introduced to the light beam B passing through the liquid crystal panel 10, and wavefront aberration in the radial direction is compensated for like the manner of the first embodiment.

Next, the setting of the correction factor K in the sensitivity correction unit 35 of the second embodiment will be described. As shown in FIG. 9A, in the case of applying the phase difference to the light beam B by driving the liquid crystal panel 10 in the above described manner, the slope of the drive voltage-phase difference characteristic varies dependently upon the temperature. This slope will be hereinafter referred to as "phase difference sensitivity". More specifically, as shown in FIG. 9A, the phase difference sensitivity PSa at low temperature is generally smaller than the phase difference sensitivity PSb at room temperature. Therefore, at low temperature, if the same drive signal Sdv (i.e., the drive signal Sdv outputted by the CPU 21 and has a value only dependent upon the detected tilt angle) as that in room temperature is outputted by the CPU 21 to generate the first to third drive signals Sdv1 to Sdv3 and the liquid crystal panel 10 is driven based on those drive signals, the phase difference actually introduced in the light beam B becomes smaller than a desired phase difference (which is required to cancel out wavefront aberration due to the detected tilt angle at low temperature). In this view, in the second embodiment, the drive signal outputted by the CPU 21 is corrected by using the correction factor K which is included in the correction signal Sk outputted by the sensitivity correction unit 35, so that the desired phase difference at low temperature can be obtained from the same drive signal at room temperature (In other words, the drive voltage-phase difference characteristic at room temperature).

More specifically, supposing that the actual phase difference sensitivity at low temperature is PSa, and the phase difference sensitivity at room temperature is PSb, the memory 35b stores in advance the correction factor K=PSb/PSa (here, K>1). If the temperature sensor detects that the temperature of the liquid panel 10 belongs to the low temperature range, the memory 35b outputs the correction factor K to the multiplier 36 as the correction signal Sk. Then, the multiplier 36 multiplies the drive signal Sdv (corresponding to the abscissa in FIG. 9B) by the correction factor K and supplies the resultant corrected drive signal Sdva to the adders 24 and 26 which produce the first drive signal Sdv1 and the third drive signal Sdv3, respectively. By this operation, as shown in FIG. 9B, the phase difference sensitivity PSa before the correction (i.e., at low temperature) is corrected to be the phase difference sensitivity PSb after the correction (i.e., at room temperature). As a result, if the same drive signal Sdv as that at room temperature is outputted by the CPU 21 to drive the liquid crystal panel 10 even at low temperature, the phase difference which appropriately compensates for wavefront aberration due to tilt can be obtained.

Specifically, as shown in 9B, at low temperature, the second drive signal Sdv2 (=reference voltage) is applied to the pattern electrode 32 so that the constant phase difference C is introduced to the corresponding area of the liquid crystal 10g. The third drive signal Sdv3 (phase difference sensitivity PSb) is applied to the pattern electrodes 30a and 30b so that the phase difference, which linearly increases according to the increase of the tilt angle, is introduced to the corresponding areas of the liquid crystal panel 10. Further, the first drive signal Sdv1 is applied to the pattern electrodes 31a and 31b so that the phase difference, which linearly decreases with the phase difference sensitivity PSb according to the increase of the tilt angle, is introduced to the corresponding areas of the liquid crystal 10g. With these phase differences, wavefront aberration being induced is effectively compensated for. It is noted that, the absolute values of the drive voltages of the first to third drive signals Sdv1 to Sdv3 actually applied to the respective pattern electrodes (shown as the solid line in FIG. 9C) become larger than the drive voltages of the first to third drive signals Sdv1 to Sdv3 before the correction (shown as the broken line in FIG. 9C) for the same tilt angle. By this, the same phase difference as that at room temperature can be generated by using the same drive signal Sdv as that at room temperature.

Now, the temperature characteristic of the correction factor K stored in the memory 35b will be studied. Taking the relation between the phase difference sensitivities PSa and PSb into account, it is desirable that the correction factor K value is set to decrease like a high-order function manner as the temperature increases in view of the drive voltage-phase difference characteristic in the liquid crystal panel 10 shown in FIG. 10. At this time, the correction factor K corresponding to room temperature is "1".

As described above, according to the driving method of the liquid crystal panel 10 of the second embodiment, the drive signal Sdv is corrected such that the liquid crystal panel 10 at the detected temperature is driven according to the drive voltage-phase difference at room temperature. Therefore, if the drive voltage-phase difference characteristic varies dependently upon the temperature variation, wavefront aberration can be compensated for by using the same drive signal as that at room temperature. Further, the correction factor corresponding to the detected temperature is read out from the memory 35b storing plural correction factors corresponding to various temperatures, and the drive signal Sdv is corrected by using the read out correction factor K and then applied. Therefore, the liquid crystal panel 10 can be driven by a simple configuration. Still further, since the liquid crystal panel 10 is driven with using the drive voltage-phase difference at room temperature as a reference, the liquid crystal panel 10 of other temperature than room temperature can be driven by the drive signal Sdv at room temperature. Thus, wavefront aberration due to tilt can be effectively compensated for and information can be accurately reproduced.

[III] 3rd Embodiment

Figure 11:
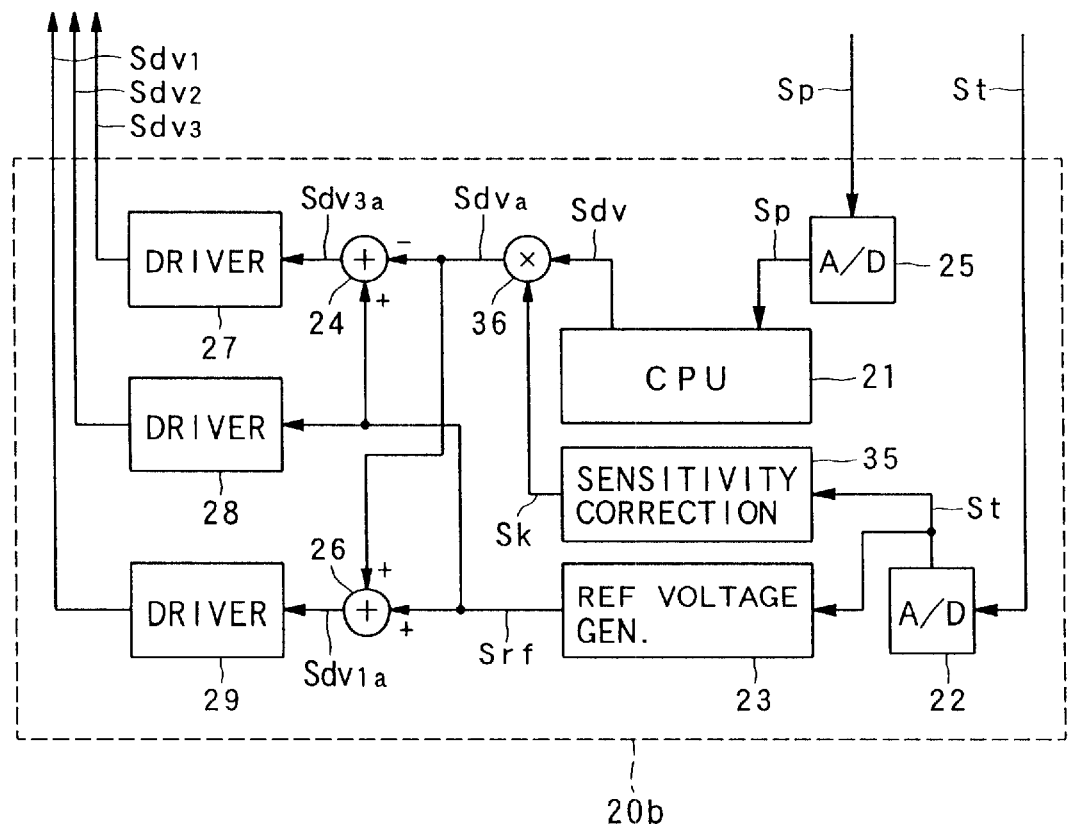
FIG. 11 is a block diagram showing a schematic configuration of a tilt control unit of an information reproduction apparatus according to the third embodiment.

Next, the third embodiment of the present invention will be described with reference to FIG. 11. FIG. 11 is a block diagram showing a schematic configuration of the tilt control unit of the information reproduction apparatus according to the third embodiment. In FIG. 11, the components identical to those of the first or second embodiment are represented by the identical reference numerals, and the description therefor will be omitted. Further, the configuration and the operation of the information reproduction apparatus of the third embodiment are identical to those in the first or the second embodiment except for the tilt control unit shown in FIG. 11, and hence the detailed description will be omitted.

In the first embodiment, by changing the range of the voltage outputted as the drive signal in accordance with the temperature, the liquid crystal panel 10 is constantly driven by utilizing the linear range of the drive voltage-phase difference characteristic. In the second embodiment, the drive signals are generated such that the liquid crystal panel at each temperature is driven by using the same drive voltage-phase difference characteristic as that at room temperature. In contrast, in the third embodiment, the liquid crystal panel 10 is driven by utilizing the concepts of both the first and the second embodiments. Namely, as shown in FIG. 11, the tilt control unit 20b of the third embodiment includes the CPU 21, the A/D converters 22 and 25, the adders 24 and 26, the drivers 27 to 29 and the reference voltage generation unit 23, which are all identical to those in the first embodiment. Further, the tilt control unit 20b includes the sensitivity correction unit 35 and the multiplier 36, which are identical to those in the second embodiment. With this arrangement, by the operation mainly using the reference voltage generation unit 23, the first to third drive signals Sdv1 to Sdv3 are generated and applied to the liquid crystal panel 10. Simultaneously, by the operation mainly using the sensitivity correction unit 35 and the multiplier 36, the phase sensitivity of the drive voltage-phase difference characteristic at each temperature is corrected, and the liquid crystal panel 10 is driven by the drive signal Sdv at room temperature thereby to introduce the desired phase difference to the light beam B. The other part of the operation of the third embodiment is identical to that of the information reproduction apparatus of the first embodiment, and hence the description will not be repeated.

As described above, according to the driving method of the liquid crystal panel 10 according to the third embodiment, the combined effect of the first and second embodiments can be achieved. Namely, the drive signals Sdv1 to Sdv3 within the linear range of the drive voltage-phase difference characteristic at the detected temperature of the liquid crystal panel 10 is applied to the liquid crystal panel 10 to compensate for wavefront aberration. Therefore, the liquid crystal panel can constantly be driven in a linear manner to compensate for wavefront aberration due to tilt. In addition, the drive signal Sdv is corrected such that the liquid crystal panel 10 of the detected temperature is driven according to the drive voltage-phase difference characteristic at room temperature, and then the corrected drive signal Sdv is applied to the liquid crystal panel 10. Therefore, even if the drive voltage-phase difference characteristic varies according to the temperature variation, the liquid crystal panel can be constantly driven by the drive signal Sdv of room temperature, thereby to compensate for wavefront aberration.

[IV] 4th Embodiment

Figure 12:
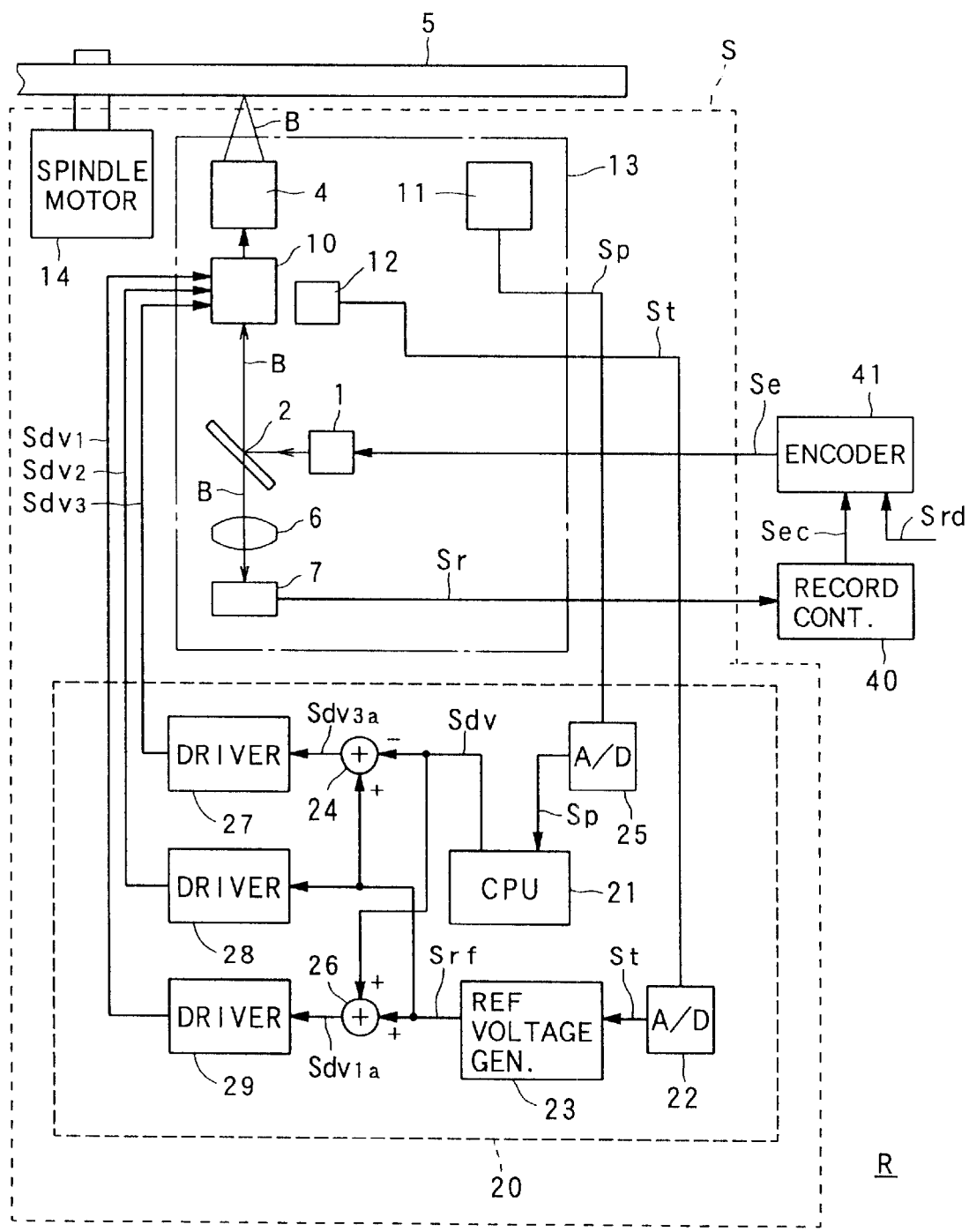
FIG. 12 is a block diagram showing a schematic configuration of an information recording apparatus of the fourth embodiment.

Next, the fourth embodiment of the present invention will be described with reference to FIG. 12. The first to third embodiments described above are directed to the application of the present invention to the information reproduction apparatus S. Apart from this, the present invention is applicable to an information recording apparatus which detects recording control information, such as address information, pre-recorded on the optical disc 5 and records information on the optical disc 5 by using the recording control information thus detected. Namely, the fourth embodiment is directed to the application of the present invention to such an information recording apparatus. FIG. 12 is a block diagram showing the schematic configuration of an information recording apparatus according to the fourth embodiment. As shown, the information recording apparatus R includes a recording control unit 40 and an encoder 41, in addition to the components employed in the information reproduction apparatus S of the first embodiment. The recording control unit 40 performs the recording control based on the reproduction signal Sr outputted by the light receiver 7 and including the above-mentioned recording control information. The encoder 41 modulates the recording signal Srd inputted from an external source based on the control signal Sec from the recording control unit 40, and generates the modulation signal Se for setting the output value of the laser diode 1 to be the value corresponding to the recording signal Srd. In this case, the output value of the laser diode 1 (i.e., the intensity of the light beam B) is intensity-modulated based on the modulation signal Se, and the modulated light beam B is irradiated on the optical disc 5 at the position corresponding to the address information included in the recording control information. Thus, information pits corresponding to the modulation signal Se is formed at the irradiated position, and thereby the recording signal Srd is recorded on the optical disc 5.

According to the operation of the information recording apparatus R, wavefront aberration due to tilt in each direction of the optical disc 5 is reliably compensated for, and hence the reproduction signal Sr including the recording control information is correctly reproduced. Therefore, information can be correctly recorded on the optical disc 5.

The above described embodiments are directed to the compensation of wavefront aberration of the light beam B by using the liquid panel 10. Alternatively, the present invention is applicable to an information reproduction apparatus and an information recording apparatus which compensate for wavefront aberration and perform reliable information recording and/or reproduction by using a certain material, which introduces a phase difference to the light beam to compensate for wavefront aberration and in which the amount of the phase difference is dependent on the temperature.

The invention may be embodied on other specific forms without departing from the spirit or essential characteristics thereof. The present embodiments therefore to be considered in all respects as illustrative and not restrictive, the scope of the invention being indicated by the appended claims rather than by the foregoing description and all changes which come within the meaning an range of equivalency of the claims are therefore intended to embraced therein.

The entire disclosure of Japanese Patent Application No.10-309194 filed on Oct. 29, 1998 including the specification, claims, drawings and summary is incorporated herein by reference in its entirety.

What is claimed is:

1. An aberration compensation device comprising:
 a phase difference generator for receiving an input signal and for generating a phase difference used for compensating for an aberration induced in a light beam;
 a temperature detector for detecting a temperature of the phase difference generator; and
 a corrector for controlling the input signal to be inputted to the phase difference generator based on the temperature detected by the temperature detector thereby to correct a reference voltage of the phase difference generator resulting from a temperature variation.

2. The device according to claim 1, wherein the input signal comprises a drive signal used to generate the phase difference and a reference signal preset for plural temperature values and functioning as a reference for the drive signal, and wherein the corrector corrects the reference voltage by controlling at least one of the reference signal and the drive signal based on the temperature detected by the temperature detector.

3. The device according to claim 1, wherein the corrector corrects the reference voltage by regarding the input signal when the phase difference generator is at a temperature higher than a preset reference temperature as the input signal lower than the input signal when the phase difference generator is at room temperature.

4. The device according to claim 2, wherein the corrector corrects the reference voltage by controlling the drive signal based on the temperature detected by the temperature detector and a preset drive signal-phase difference characteristic indicating a relation between the drive signal and the phase difference generated by the drive signal.

5. The device according to claim 2, wherein the corrector corrects the reference voltage by controlling the drive signal based on the temperature detected by the temperature detector and a preset drive signal-phase difference characteristic indicating a relation between the drive signal and the phase difference generated by the drive signal.

6. The device according to claim 5, wherein the corrector generates the reference signal such that the drive signal is applied to the phase difference generator within a range where the drive signal-phase difference characteristic is linear.

7. The device according to claim 5, wherein the corrector comprises a memory unit for storing a plurality of reference signals preset in correspondence with the temperature values, and wherein the corrector reads out the reference signal corresponding to the temperature detected by the temperature detector from the memory unit to generate the input signal and corrects the reference voltage.

8. The device according to claim 1, wherein the aberration is induced in the light beam due to a tilt generated between an optical axis of a light beam and a storage medium when the light beam is irradiated on the storage medium.

9. An optical pickup comprising:
 an aberration compensation device comprising:
  a phase difference generator for receiving an input signal and for generating a phase difference used for compensating for an aberration induced in a light beam;
  a temperature detector for detecting a temperature of the phase difference generator; and
  a corrector for controlling the input signal to be inputted to the phase difference generator based on the temperature detected by the temperature detector thereby to correct a reference voltage of the phase difference generator resulting from a temperature variation, the aberration being induced in the light beam due to a tilt generated between an optical axis of a light beam and a storage medium when the light beam is irradiated on the storage medium;
 a light emitter for emitting a light beam to be incident upon the aberration compensation device;
 a tilt detector for detecting the tilt; and
 a light receiver for receiving the light beam after the aberration is compensated for and for generating a light reception signal, wherein the corrector generates the input signal and inputs the input signal to the phase difference generator, the input signal including the drive signal used to introduce the phase difference to the light beam to compensate for the aberration due to the tilt detected by the tilt detector.

10. An information reproduction apparatus comprising:
 an optical pickup comprising:
  an aberration compensation device comprising:
   a phase difference generator for receiving an input signal and for generating a phase difference used for compensating for an aberration induced in a light beam;

a temperature detector for detecting a temperature of the phase difference generator; and a corrector for controlling the input signal to be inputted to the phase difference generator based on the temperature detected by the temperature detector thereby to correct a reference voltage of the phase difference generator resulting from a temperature variation, the aberration being induced in the light beam due to a tilt generated between an optical axis of a light beam and a storage medium when the light beam is irradiated on the storage medium;

a light emitting for emitting a light beam to be incident upon the aberration compensation device;

a tilt detector for detecting the tilt;

a light receiver for receiving the light beam after the aberration is compensated for and for generating a light reception signal, wherein the corrector generates the input signal and inputs the input signal to the phase difference generator, the input signal including the drive signal used to introduce the phase difference to the light beam to compensate for the aberration due to the tilt detected by the tilt detector; and a reproduction unit for reproducing information from the storage medium based on the light reception signal.

11. An information recording apparatus comprising:

an optical pickup comprising:

an aberration compensation device comprising:

a phase difference generator for receiving an input signal and for generating a phase difference used for compensating for an aberration induced in a light beam;

a temperature detector for detecting a temperature of the phase difference generator; and a corrector for controlling the input signal to be inputted to the phase difference generator based on the temperature detected by the temperature detector thereby to correct a reference voltage of the phase difference generator resulting from a temperature variation, the aberration being induced in the light beam due to a tilt generated between an optical axis of a light beam and a storage medium when the light beam is irradiated on the storage medium;

a light emitter for emitting a light beam to be incident upon the aberration compensation device;

a tilt detector for detecting the tilt;

a light receiver for receiving the light beam after the aberration is compensated for and for generating a light reception signal, wherein the corrector generates the input signal and inputs the input signal to the phase difference generator, the input signal including the drive signal used to introduce the phase difference to the light beam to compensate for the aberration due to the tilt detected by the tilt detector;

a reproduction unit for reproducing information from the storage medium based on the light reception signal; and a recording unit for controlling the light beam based on the information reproduced by the reproduction unit and recording information thereby to record the recording information.

* * * * *